United States Patent

[11] 3,604,462

| [72] | Inventors | William C. Dreher<br>San Jose;<br>Duncan B. Ross, Santa Clara, both of, Calif. |
|---|---|---|
| [21] | Appl. No. | 579,380 |
| [22] | Filed | Sept. 14, 1966 |
| [45] | Patented | Sept. 14, 1971 |
| [73] | Assignee | Owens-Corning Fiberglas Corporation |

[54] FLEXIBLE TUBING AND METHOD OF MAKING SAME
8 Claims, 6 Drawing Figs.

[52] U.S. Cl. .................................................... 138/139
[51] Int. Cl. ..................................................... F16l 11/08
[50] Field of Search .......................................... 138/139, 141, 144, 119, 129, 137, 138, 132; 156/143

[56] References Cited
UNITED STATES PATENTS

| 2,308,343 | 1/1943 | Wilkinson et al. ............. | 138/132 |
| 2,609,002 | 9/1952 | Meissner ....................... | 138/132 X |
| 3,216,459 | 11/1965 | Schroeder et al. ............. | 138/139 |

*Primary Examiner*—H. Hampton Hunter
*Attorneys*—Myron E. Click and Staelin & Overman ABSTRACT: A dimensionally stable helical coil is nested in an unstressed state inside a thick tubular wall of insulating material. The convolutions of the coil are spaced apart a distance in the range of two-thirds to 1½ of the thickness of the wall. The wall preferably is formed by depositing a layer of glass fibers and binder adjacent a glass fiber fabric and curing the binder to integrate the fibers into a mat and to adhere the fabric to the mat to form an inner facing for the wall.

PATENTED SEP 14 1971 3,604,462

WILLIAM C. DREHER &
DUNCAN B. ROSS
INVENTORS

BY Staelin + Overman
ATTORNEYS

FLEXIBLE TUBING AND METHOD OF MAKING SAME

The present invention relates to flexible tubing in general and, in particular, to flexible tubing having an unusually high unitary strength, much improved flexing or bending characteristics, and improved workability for installation purposes.

Commercial and residential construction is proceeding at a rapid pace kindling great interest in new materials or products adapted to improve efficiencies of systems being installed as well as to lower the labor costs involved in installation. This is particularly true in air-conditioning and/or heating systems, whether the installations are in new or already existing structures. The flexible tubing utilized in such systems must be able to convey air at the pressures used over distances usually limited by local building codes. Thus the wall of the tubing must be nonporous, the interior of the tubing must be corrosion resistant, the tubing must have good axial tensile strength and strength to resist crushing under forces applied external to the tubing by either transverse crushing forces or forces applied whenever the tubing is flexed over a sharp radii which tend to cause the tubing to collapse inwardly.

With the increased use of such flexible tubing the requirements for insulation standards have increased. In order to attain the improved insulation characteristics the walls of the flexible tubing have been substantially increased in thickness. With the increased thickness of the wall there has been a reduced ability to flex the tubing or ducts over sharp radii since the surface at the inside of the curve section tends to collapse and project into the interior of the duct. This restricts the passageway of the duct, cutting down the carrying capacity and thereby reducing the number of places in which said flexible tubing may be installed or reducing the efficiency of such tubing when installed over sharp radii. As the result specifications have been written stating the minimum radii at which flexible ducts can be used. For example, 12-inch flexible ducts could be used in the past at a minimum radius of approximately 20 feet. This detracts seriously from the advantages otherwise available in the use of flexible ducts.

Another serious disadvantage of ducts presently in use is that the spring wire used to form the skeleton or frame of the duct was under constant stress due to the way in which it was taken from a coil and would onto a forming mandrel. If the spring wire broke at any point or came loose, it snapped into a tangle of wires and ruined the section. Similarly, if it was desired to cut the flexible tubing into smaller sections for use in closer connections the cutting of the spring wire again resulted in the tangle and great difficulty in connecting the cut sections.

Accordingly, it is a principal object of this invention to provide a novel form of insulated duct which is highly flexible and yet highly resistant to collapsing from externally applied radial forces or flexing.

Another object of this invention is to provide a flexible insulated duct which is relatively inexpensive to manufacture and lends itself to easy installation.

It is a further object of this invention to provide a new and improved flexible duct or tubing in which the wire skeleton or frame is preformed and thus in an unstressed condition after the tubing is constructed enabling the cutting of the flexible tubing into smaller sections without the tangling of the frame or skeleton.

It is a still further object of this invention to provide an improved flexible tubing or duct in which the relationship between the thickness of the walls of the tubing, the wire spacing in the helix or supporting frame, the compressibility of the insulation in the wall, and the gauge of the wire utilized in forming the helix or frame is such that the tubing may be flexed or bent over a sharp radius without collapsing toward the interior thereof.

It has been discovered that if the spring wire helix or skeleton is preformed the wire on the mandrel lies in a relatively relaxed condition and has no forces tending to displace it from the configuration in which it was placed during the forming operation. The helix may be preformed by running spring wire through a wire-straightening machine from the storage package and then through a bending machine so that the wire, just before being wound on the mandrel, is bent into a curvature approximately corresponding to the circumference of the mandrel and thus the inside diameter of the tubing being constructed. As a consequence, the duct is more easily flexed and the breakage or loosening of the wire does not have the damaging effects that in many cases would render the duct unusable. Further, the convolutions of the helix tend to maintain an even spacing under flexed conditions. It was further discovered in a construction of the flexible duct that the use of a spring wire for the skeleton or supporting helix whose diameter and spacing in the helix are selected in relation to the diameter of the duct and the thickness of the wall insulation will enable the construction of a duct which has the ability to be flexed over a sharp radius. By proper selection of the spacing of the wire in the helix with respect to the thickness of the wall, the exterior and insulation layers will deform in such a way between the convolutions of the wire skeleton so that the duct has a very much reduced tendency to collapse. The gauge of the wire is selected to provide strength for each convolution which is larger than the force necessary to deform the insulating wall. As a result the duct of this invention has an improved ability to flex or bend around curves without collapse, while retaining a very desirable overall stiffness. Further, this construction enables the use of "jack-in-the-box" axial compression packing, affording substantial packaging, storage and freight savings. When taken from the package at the job the duct may be expanded to its original length without the loss of its desirable characteristics.

The invention thus features a flexible duct the combination of which comprises a continuous wire forming a helix having spaced convolutions, a comparatively thick wall member of compressible insulating material encircling the wire helix, and means for maintaining the wire convolutions in spaced relation to each other. The spacing of each convolution from an adjacent convolution is in the range of ¾ to 1½ of the thickness of the wall member thereby allowing the wall member to deform between the convolutions in response to a flexing over a sharp radius without an inward collapse. The gauge of the wire is chosen to be sufficient to provide a radial strength for each convolution which is larger than the force necessary to compress the insulating wall member into the deformed state when the wall member is flexed over a sharp radius. The convolution spacing may be maintained by adhering the wire of the helix to the wall member. The convolutions may be further maintained in spaced relationship by the use of a wire helix which is preformed to the desired curvature and convolution spacing which enables the helix to nest within the wall member in a relaxed condition when the duct is not flexed.

The invention also embraces a method for making a flexible duct which comprises the step of preforming a wire into a helix by bending the wire into a curvature corresponding to the desired inside diameter of the duct and the desired spacing between successive convolutions of the helix, and encircling the helix with a wall of compressible insulating material having a thickness in the range of ⅔ to 1⅓ the distance between successive convolutions of the helix. A further step of the method comprises choosing a diameter of wire for the helix which is sufficient to provide a radial strength for each convolution which is larger than the force necessary to compress the insulating wall member when the wall member is flexed over a sharp radius. To aid in the guiding the deformation of the wall member the inner side of the wall member may be faced with a fabric. The step of facing the inner side of the wall member with a fabric may include the steps of depositing insulating fibers and binder onto the fabric and curing the binder to obtain an insulating mat bonded to the fabric. Further layers of insulation may be wrapped around such an insulating bonded mat. Finally a nonporous outer covering is applied to the wall.

Other objects, advantages and features of this invention will become apparent when the following description is taken in conjunction with the accompanying drawings, in which.

Figure 1:
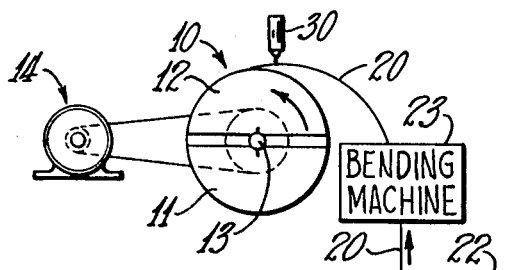
FIG. 1 is a schematic layout of apparatus utilized to construct the tubing of this invention.
Figure 2:
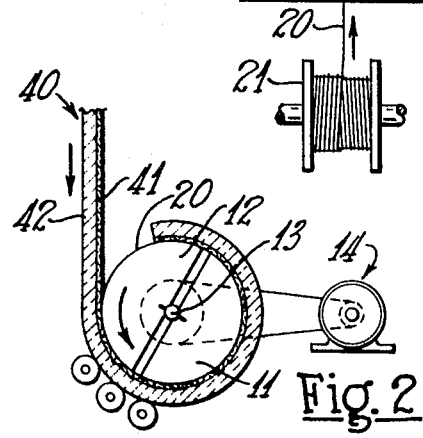
FIG. 2 is a schematic layout of further apparatus for constructing the tubing of this invention.

Referring to FIGS. 1 and 2 there is illustrated apparatus for carrying out the novel method in making the novel flexible tubing of this invention. A mandrel generally designated at 10 includes semicircular sections 11 and 12 mounted on a shaft 13 for rotation. The sections 11 and 12 may be collapsed toward each other in order to remove the flexible tubing therefrom whenever the construction is finished. Motor or other means 14 is connected to drive the shaft 13 for rotation. A helix for the frame or skeleton of the flexible tubing is constructed from a wire 20 which is taken from a supply package 21. The wire is passed through a wire straightener 22 to remove the inherent curl from the wire which is acquired while stored on package 21. The wire 20 is then forwarded through a bending machine 23 which preforms the wire 20 into a helix by bending the wire into a curvature corresponding to the desired inside diameter of the duct and the desired spacing between successive convolutions of the helix. The output of the bending machine 20 may be moved along the length of the mandrel as the helix is formed. The mandrel 10 is chosen to be of a size substantially equal to the desired inside diameter of the flexible tubing being constructed.

Referring to FIG. 2 there is illustrated the encircling of the helix formed on the mandrel 10 with a wall member 40 of compressible insulating material. The wall member 40 preferably comprises a layer of compressible insulation adhered to an inner fabric facing 41. The fabric 41 is advantageously a glass fiber fabric for reasons to be noted hereinafter. An applicator station 30 shown in FIG. 1 is utilized to apply an adhesive to the wire 20 forming the helix.

Figure 3:
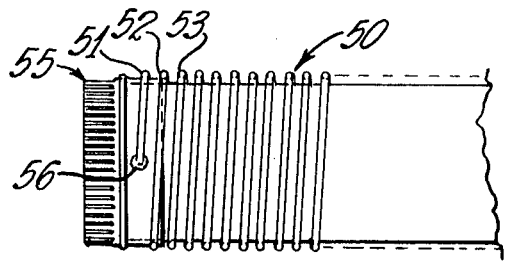
FIG. 3 is a view in elevation of a skeleton or framework of the flexible tubing of this invention.
Figure 4:
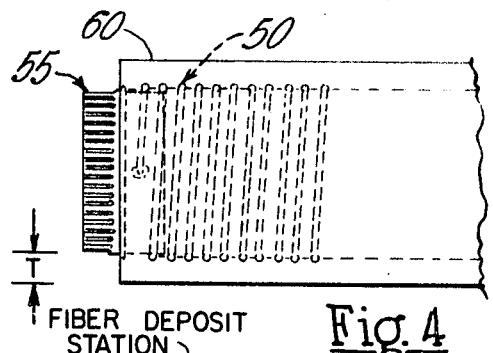
FIG. 4 is an illustration of the relationship between the size of the wire, spacing of the convolutions of the helix, and the thickness of the wall member of the flexible tubing.

In constructing the flexible duct so that the duct may be bent or flexed around a small radius the spring wire 20 is selected to have a diameter and a spacing in the helix according to a predetermined relationship with the inside diameter of the duct and the compressibility of the insulating material. Referring to FIGS. 3 and 4 the frame or helix 50 has successive convolutions 51, 52, 53, etc. The helical coil 50 is of a corrosive resistant wire and is secured at 56 at each end to a fitting 55 by soldering, sheet metal screws, insertion into a tab or slot formed in the fitting 55, etc. By securing connectors 55 to the helical coil 50 in this manner, connections may be made directly to the connectors 55 at joints by the use of sheet metal screws or other mechanical fastenings where in the past the connection was generally solely accomplished by the use of tape. It may still be advantageous to utilize tape when making the joints in certain applications to prevent air leaks or pressure loss in the system. However, it will be seen that the use of the connectors 55, shown here as stove pipe connectors of the desired diameter, will greatly add to the axial strength of the system when installed in combination with an inner layer facing of fabric. The stove pipe connectors 55 are advantageously nested within the ends of the helical coils 50 for easier attachment to the coil and to prevent interference with the interior of the tubing when joints are made with similar connector members of other pieces of flexible tubing or with other ducts of the system.

Figure 6:
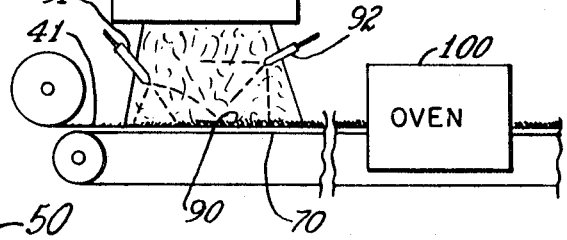
FIG. 6 is a schematic illustrating a method for forming a wall for use in the flexible tubing.

Referring to FIG. 4 there is illustrated the completed product wherein the flexible helix or coil 50, having connector members 55 secured to the ends thereof, is covered by a flexible wall or covering 60 which is formed from the wall member 40 illustrated in FIG. 2 plus a nonporous outer layer. The flexible covering 60 may include the inner facing 41 which is advantageously comprised of a glass fiber fabric which resists deterioration and provides a smooth flow surface for the interior of the flexible tubing. Further, the fabric admits sound to the insulation 42 for attenuation. Also, the attachment of the inner facing to the end connectors by adhesives or other suitable means provides a much greater axial strength for the completed section. In addition to the inner facing 41 one or more layers of insulating material or mat 42 are provided, the innermost layer of which is advantageously bonded or adhered to the inner facing 41. This is best accomplished as shown in FIG. 6 by forming one section of the wall member in the single operation of providing the glass fiber fabric 41 as a collecting surface, supported by conveyor 70 below a fiber deposition station 80, and depositing thereon insulating fibers 90 and binder from nozzles 91 and 92. The binder is cured in oven 100 to obtain an integrated matlike insulating mass which is bonded to the fabric 41 juxtaposed adjacent the integrated mat. As noted hereinbefore additional layers of insulation may be applied exterior to the layer 42. Finally, a sleeve or other flexible protective outer covering may be added to the exterior of the wall 60.

Referring again to the FIGS. 3 and 4 it has been found that when a comparatively thick wall member of compressible insulating material is utilized to encircle the wire helix that it is necessary to provide a predetermined relationship between the spacing of each convolution from an adjacent convolution in the range of ¾ to 1½ of the thickness "T" of the wall member 60 in order to allow the wall member to deform between the convolutions in response to a flexing over a sharp radius without an inward collapse of the tubing. Further, the gauge of the wire must be sufficient to provide a radial strength for each convolution which is larger than the force necessary to compress the insulating wall member into the deformed state when the wall member is flexed over the sharp radius. By preforming the helix so that it is in a relaxed condition on the mandrel 10 the even spacing of the convolutions tend, when the tubing is flexed, to aid in the even deformation of the wall member between the convolutions of the helix. In order to further insure that the respective convolutions maintain an even spacing the convolutions may be adhered to the inner face of the wall member as described hereinbefore.

In specific applications it has been found that when the inside diameter of the flexible tubing does not exceed 7 inches that the diameter of the wire of the helix utilized is advantageously approximately four one-hundredths of an inch or a 19 gauge. Further, when the inside diameter does not exceed 7 inches the spacing between the convolutions may be made approximately three-quarters of an inch. Still further, when the inside diameter does not exceed 7 inches the thickness of the wall member may be made approximately one inch to attain the best insulation qualities while insuring that the tubing will flex properly over a sharp radius.

When the inside diameter of the tubing does not exceed 12 inches the diameter of the wire of the helix may be approximately six one-hundredths of an inch or 16 gauge. In tubing not exceeding 12 inches in inside diameter the spacing between the convolutions may be approximately 1 inch. Further, with such tubing the thickness of the wall member may again be approximately 1 inch.

When the inside diameter of the tubing does not exceed 18 inches the diameter of the wire of the helix may be approximately eight one-hundredths of an inch or 14 gauge wire. With such a diameter the spacing between the convolutions may be approximately 1½ inches and the wall thickness may be approximately 1 inch.

It should be noted that although specific examples are set forth herein, that the invention is not confined to the specific dimensions, which are advantageous for the particular sizes discussed, but serve merely to illustrate the invention in its narrowest scope.

Figure 5:
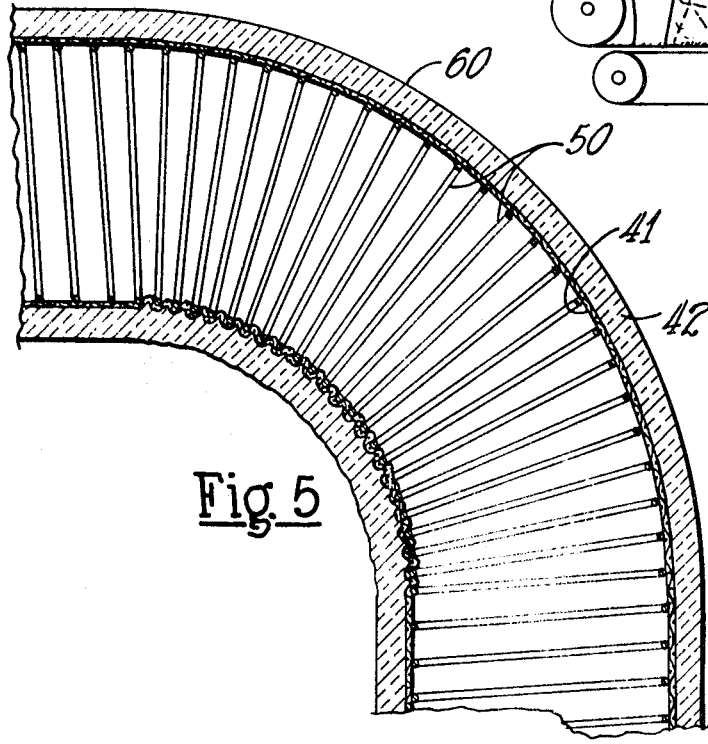
FIG. 5 is a cross-sectional view of flexible tubing constructed according to this invention illustrating its ability to flex without collapsing.

Referring to FIG. 5 there is illustrated a cross-sectional view of tubing constructed according to this invention which is shown in a flexed position. It will be noted that the wall member 60 deforms inwardly between successive convolutions of the skeleton or helix frame 50 as it is compressed inwardly on the inside of the radius of the flex. The factors discussed hereinbefore which have been utilized in determining the relationship of the various elements utilized in the construction of this tubing enable the flexing of the tubing over a sharp radius. The even spacing of the relaxed helical frame 50, the utilization of a glass fabric as the inner facing of the wall 60 which is adhered to and thus aids in the deformation of the insulating portion of the wall 60, the gauge of the wire which resists the radial crushing or compressive forces due to the flexing and the spacing of the convolutions of the helical frame 50 all contribute to the novel result attained. Although it is possible to use only a portion of the just described features of construction and attain a better flexing than prior products, the use of all of the relationships defined herein contribute to the best construction for the tubing as described.

In conclusion, it is pointed out that while the illustrative examples constitute practical embodiments of the invention, it is not intended to limit the invention to the exact details or dimensions shown or discussed since modifications may be made without departing from the spirit and scope of the invention disclosed.

We claim:

1. In a flexible duct the combination of: a comparatively thick tubular wall member of compressible insulating material, and a supporting preformed helical coil having a predetermined diameter and convolution spacing nested within said tubular wall member in a relaxed unstressed condition, the spacing of each convolution from an adjacent convolution being in the range of ¾ to 1½ of the thickness of said wall member thereby allowing said wall member to deform between said convolutions in response to a flexing over a sharp radius without an inward collapse.

2. A duct as defined in claim 1 in which said tubular wall member includes an insulating layer of fibers integrated into mat form and an adjacent inner layer of fabric bonded to said integrated mat, and means for adhering said relaxed helical coil to said inner fabric layer of said wall member so that said fabric layer guides the deformation of the attached mat between said convolutions of said helical coil when said duct is flexed or axially compressed for packaging.

3. A duct as defined in claim 1 in which the thickness of said wall member is approximately 1 inch.

4. A method for making a flexible duct comprising the steps of preforming a dimensionally stable helical coil having a diameter corresponding to the desired inside diameter of the duct and a predetermined spacing between convolutions, forming a wall of compressible insulating material having a thickness in the range of ⅔ to 1⅓ of the distance between successive convolutions of said helical coil, and encircling said helical coil with said wall of insulating material while said helical coil is in an unstressed state.

5. A method as defined in claim 4 in which said step of forming said wall includes integrating a layer of fibers into a mat form and which further includes the step of facing the inner side of said mat with a fabric adhered to said mat.

6. A method as defined in claim 5 in which said facing step includes the steps of depositing said layer of fibers and a binder onto said fabric and curing said binder to obtain an integrated fiber mat bonded to said fabric.

7. A method for making a flexible duct comprising the steps of forming a helical coil skeleton, forming a wall by depositing a layer of fibers and binder adjacent a fabric facing and curing said binder to integrate said fibers and adhere said fabric facing to said integrated fibers, and wrapping said wall around said helical coil with said fabric as an inner face thereof.

8. A flexible duct comprising a thick tubular insulating wall formed from a mat of integrated glass fibers, a dimensionally stable helical coil nested in a relaxed state inside said tubular wall and having successive convolutions spaced apart a distance within a range of ¾ to 1½ the thickness of said wall, and an inner facing of glass fiber fabric adhered to said integrated mat wall to guide the deformation of said wall between said convolutions when said duct is flexed or compressed.